United States Patent
Haulk

(10) Patent No.: US 11,308,547 B2
(45) Date of Patent: Apr. 19, 2022

(54) METHOD AND SYSTEM FOR GENERATING A STORE PLANOGRAM AND IDENTIFYING A SUSPECT CUSTOMER

(71) Applicant: NCR Corporation, Atlanta, GA (US)

(72) Inventor: Kevin Winton Haulk, Griffin, GA (US)

(73) Assignee: NCR Corporation, Atlanta, GA (US)

( * ) Notice: Subject to any disclaimer, the term of this patent is extended or adjusted under 35 U.S.C. 154(b) by 55 days.

(21) Appl. No.: 16/555,705

(22) Filed: Aug. 29, 2019

(65) Prior Publication Data

US 2021/0065281 A1  Mar. 4, 2021

(51) Int. Cl.
| | | |
|---|---|---|
| *G06Q 30/00* | (2012.01) | |
| *G06Q 30/06* | (2012.01) | |
| *G06Q 30/02* | (2012.01) | |
| *G06K 9/62* | (2022.01) | |
| *G06K 9/00* | (2022.01) | |

(52) U.S. Cl.
CPC ..... *G06Q 30/0639* (2013.01); *G06K 9/00771* (2013.01); *G06K 9/6278* (2013.01); *G06Q 30/0202* (2013.01); *G06Q 30/06* (2013.01); *G06Q 30/0601* (2013.01)

(58) Field of Classification Search
CPC .... G06Q 30/00; G06Q 30/06; G06Q 30/0639; G06Q 30/02; G06Q 30/0202; G06Q 30/08; G06Q 30/0601–6/45; G06K 9/00; G06K 9/00624; G06K 9/00771; G06K 9/62; G06K 9/6267; G06K 9/6268; G06K 9/6277; G06K 9/6278
USPC ...................................... 705/26.9, 26.1–27.2
See application file for complete search history.

(56) References Cited

U.S. PATENT DOCUMENTS

| | | | |
|---|---|---|---|
| 9,892,438 B1* | 2/2018 | Kundu | G06Q 30/0609 |
| 10,789,822 B1* | 9/2020 | Deutsch | G08B 13/26 |
| 10,963,893 B1* | 3/2021 | Sharma | G06K 9/6293 |
| 2015/0112826 A1* | 4/2015 | Crutchfield, Jr. | G06Q 30/0601 705/26.1 |
| 2017/0323359 A1* | 11/2017 | Dey | G06Q 30/0609 |
| 2019/0236531 A1* | 8/2019 | Adato | G06K 9/00771 |
| 2019/0303676 A1* | 10/2019 | Costello | G07G 1/0009 |
| 2020/0019921 A1* | 1/2020 | Bui | G06Q 10/087 |
| 2020/0034812 A1* | 1/2020 | Nemati | G06Q 20/3276 |
| 2020/0065748 A1* | 2/2020 | Durkee | G06K 7/1408 |
| 2020/0184230 A1* | 6/2020 | Liu | G06K 9/00342 |

(Continued)

OTHER PUBLICATIONS

Estopace, Eden. "Cameras, Sensors, and AI Shaping Future of Retail at Walmart." FutureIoT, May 7, 2019, futureiot.tech/cameras-sensors-and-ai-shaping-future-of-retail-at-walmart.*

*Primary Examiner* — Michael Misiaszek
*Assistant Examiner* — Lindsey B Smith
(74) *Attorney, Agent, or Firm* — Schwegman, Lundberg & Woessner

(57) ABSTRACT

Disclosed are systems and methods for generating a planogram of a store. The systems and methods may include receiving a plurality of images and transaction data. At least one of the plurality of images may include user data representing a user proximate the product. The transaction data may be associated with a completed purchase of the product. Based on the transaction data and the user data, a probability of the user retrieving the product may be determined and used to generate the planogram of the store.

10 Claims, 3 Drawing Sheets

(56) References Cited

U.S. PATENT DOCUMENTS

2020/0250736 A1* 8/2020 Howard ............. G06Q 30/0635
2020/0364999 A1* 11/2020 Mullins ............ G08B 13/19615

* cited by examiner

METHOD AND SYSTEM FOR GENERATING A STORE PLANOGRAM AND IDENTIFYING A SUSPECT CUSTOMER

SUMMARY

Disclosed are systems and methods for generating a planogram of a store. The systems and methods may include receiving a plurality of images and transaction data. At least one of the plurality of images may include user data representing a user proximate the product. The transaction data may be associated with a completed purchase of the product. Based on the transaction data and the user data, a probability of the user retrieving the product may be determined and used to generate the planogram of the store.

BRIEF DESCRIPTION OF THE FIGURES

The above-mentioned and other features and advantages of this invention, and the manner of attaining them, will become more apparent and the invention itself will be better understood by reference to the following description of embodiments taken in conjunction with the accompanying drawings, wherein.

Corresponding reference characters indicate corresponding parts throughout the several views. The examples set out herein illustrate possible embodiments, and such examples are not to be construed as limiting the scope of this disclosure in any manner.

DETAILED DESCRIPTION

Figure 1:
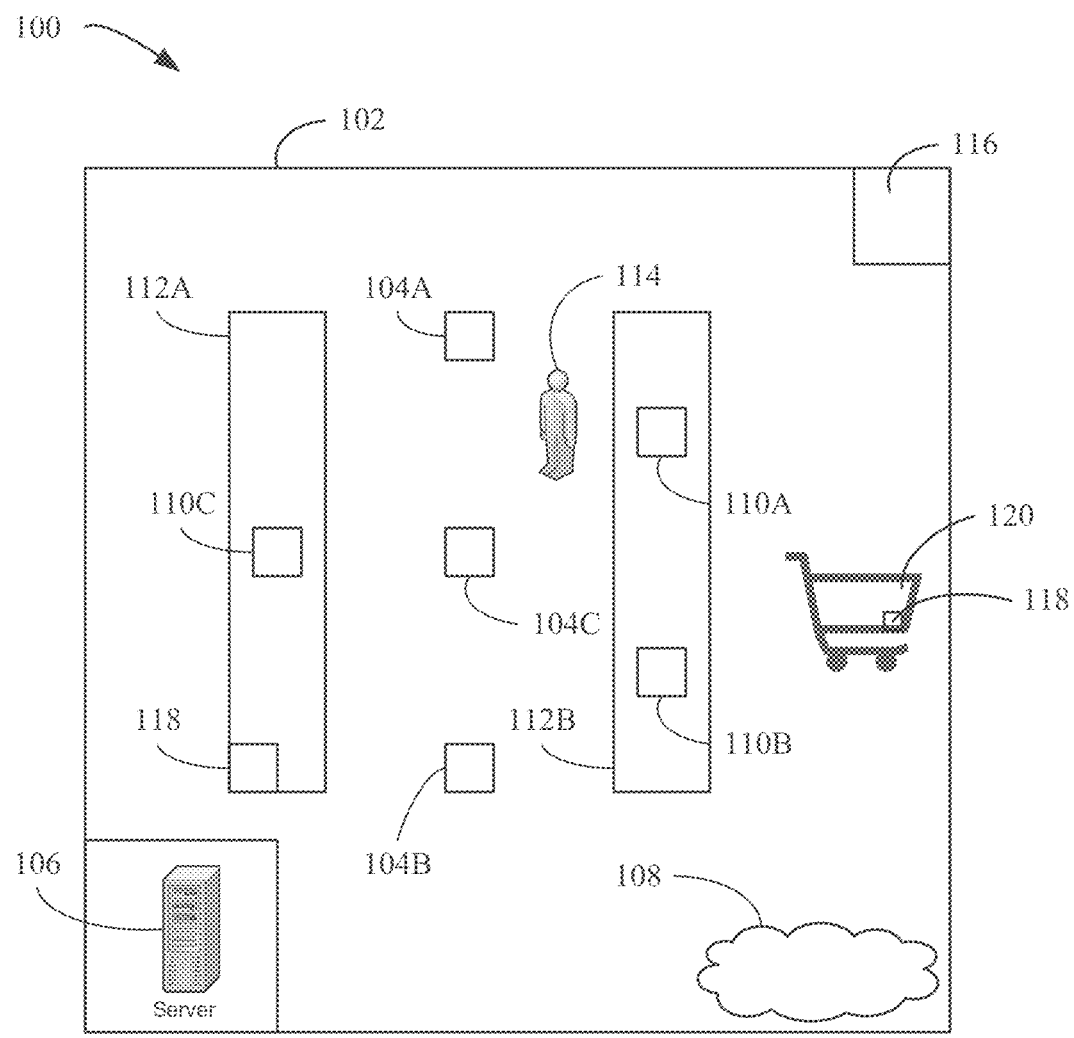
FIG. 1 shows an example operating environment consistent with this disclosure.

Data indicating item placement on store shelves, sometimes referred to as planogram data, may be useful for item identification in middle-of-the-store scenarios. In many cases, planogram data from the customer is either unreliable or missing entirely. However, over time, planogram data can be generated and/or approximated based on where on the shelf edge a person grabbed an item and what items are present in transaction data at the completion of purchasing items as indicated by a listing on the customer's final receipt. By combining this information a probability, P(grabbed item is X|customer grabbed at location Y), may be derived which can then be recomputed over time to generate and/or emulate a planogram.

Item identification on a large scale in a retail environment is difficult. The availability of planogram data may be limited, the accuracy may be suspect, and in some instances, planogram data may not exist at all for a store, or portion of a store. As such, methods for identifying products and generating planogram data are needed for use in frictionless stores, asset protection, etc.

As disclosed herein, by using overhead cameras in the shelf (item) areas of the store, shelf edges may be computed and gestures analyzed using various techniques, such as computer vision, etc. Thus, when a customer has potentially grabbed an item from a particular section of the view of a given set of cameras can be determined. With planogram information, the location information may be used to determine the most likely item removed from the area.

However, in the absence of planogram data, a reasonable likelihood that an item is in that area may be determined as disclosed herein, which approximates the planogram data, by knowing the items associated with the customer at checkout. If the information about shelf locations and items in associated receipts is maintained, a progressively more accurate probability may be calculated that, if a customer reaches for an item at location Y, there is a good probability that the item is X. Stated another way, using the shelf location and receipt (i.e., transaction data) the probability item X is picked up by the customer given the customer picked up an item in location Y can be determined.

To illustrate a simple case, suppose customer A is seen pulling one item from each of locations $Y_1$ and $Y_2$ and the customer's receipt shows a soda and a candy bar. If customer B pulls items from locations $Y_1$ and $Y_3$ and their receipt shows the soda and a pack of gum, then using probability theory, such as one or more Bayesian methods, it can be determined, in this example case, that there is a higher likelihood that the soda is at location $Y_1$. In other words, since the soda and location $Y_1$ are the only two common elements between customers A and B, the likelihood that location $Y_1$ contains the soda is high.

By preserving this type of information over time for every customer, a reasonable approximation of a planogram for the store can be computed. Furthermore, if a person is seen by the cameras to remove an item from a known location, but the item associated with the location is not in the receipt, new information is now available that could lead to a potential audit of that customer.

As disclosed herein, data for customers and products obtained by cameras can be supplemented using weight data obtained by weight sensors. For example, the shelves within a store and carts customers use within the store may be equipped with weight sensors. When products are removed from shelves, the weight sensors on the shelves may be able to determine a change (i.e., a decrease) in weight supported by the shelf and weight sensors on the carts may be able to determine a change (i.e., an increase) in weight supported by the carts. This can also work in reverse when a customer first picks up an item and then returns the item to the shelf.

Turning now to the figures, FIG. 1 shows an example operating environment 100 consistent with this disclosure. As shown in FIG. 1, operating environment 100 may include a store 102. Within store 102 may be a first camera 104A, a second camera 104B, and a third camera 104C (collectively cameras 104) and a server 106. Cameras 104 may be in communications with server 106 via a network 108. Cameras 104 may be located to capture one or more images of items such as a first item 110A, a second item 110B, and a third item 110C (collectively items 110). Items 110 may be located on one or more shelves 112, such as a first shelf 112A and a second shelf 112B. While FIG. 1 shows only a few shelves, cameras, and items, any number of cameras, shelves, and items may be located within store 102.

As a customer 114 walks through store 102, cameras 104 may capture images of items customer 114 picks up or otherwise interacts with throughout store 102. Cameras 104 may also capture images of customer 114 and/or body parts of customer 114. For example, as customer 114 walks through store 102, he or she may pick up first item 110A and first camera 104A and third camera 104C may capture images of customer 114's hands as they reach for first item 110A. Cameras 104 may capture images of first item 110A and customer 114 from various angles in relation to one another. Stated another way, cameras 104 may capture different perspectives of items 110 and customer 114. For example, first camera 104A may capture images of customer 114 and first item 110A from a left side of customer 114 and second camera 104B may capture images of first item 110A and customer 114 from a right side of customer 114.

The captured images may be transmitted from cameras 104 to server 106 via network 108. As disclosed herein, server 106 may perform an image analysis on the images and extract features from the images as part of an object tracking operation. For example, the various images may be processed to identify customer 114's hands. Once customer 114's hands have been identified, from one image to another, the location of customer 114's hands may be monitored. By tracking the location of customer 114's hands, server 106 may be able to determine a location of customers 114's hands relative to items located on shelves 112.

Shelves 112 may each have a plurality of separate shelves. For example, first shelf 112A may have five individual shelves that are space one foot apart from one another and second shelf 112B may have four shelves that are spaced 1.5 feet apart from one another. Because cameras 104 have a fixed location within store 102, each shelf of shelves 112 may have a fixed orientation and the front edge of each shelf may act as a reference for object tracking. For example, the first and second shelves from the floor may be parallel to one another and images captured by first camera 104A and third camera 104C may use the front edges of the shelves as references to track customer 114's hand. For instance, if customer 114's hand is located in between the front edges of the shelves, then the inference may be that customer 114's hand is reaching for an object on the bottom self.

Other examples of object tracking include marking objects within a first image with a marker and then following the marker throughout subsequent images. For example, customer 114's hand may be marked by server 106 with a marker. The marker may be artificially created by server 106 or may be a natural marker found within the image. For example, a spot or other feature on a sleeve of a sweater worn by customer 114 may be selected by server 106. The spot or other feature may then be used to track movement of customer 114's arm.

During analysis of the images, the images may be cropped to remove extraneous imagery. For example, server 106 may use stock images of store 102 and/or shelves 112 as a reference that includes background without customer 114. Server 106 may use the stock images to identify subject matter, such as customer 114 in the plurality of images that is not found in the stock images or is irrelevant to the image tracking. Server 106 may then crop or otherwise remove extraneous imagery. For instance, server 106 may use the stock images to determine which pixels in the plurality of images are background and which pixels represent customer 114. Pixels a greater distance than a predetermined distance from the pixels that represent customer 114 may be removed to help with object tracking.

Another aspect of object tracking may include tracking a color within the plurality of images. For example, the color of customer 114's clothing may be used as a marker and tracked. For instance, customer 114 is wearing a red sweater and the floor of store 102 then server 106 may use red pixels to distinguish customer 114's sleeve from the floor. Server 106 may then track red pixels as a way tracking where customer 114 reaches by tracking customer 114's sleeve/arm.

After items have been picked from shelves 112, customer 114 may pay for the items at a point of sale terminal 116. Point of sale terminal 116 may communicate with server 106 via network 108. The communication may allow point of sale terminal 116 to transmit, and server 106 to receive, transaction data. The transaction data may include a listing of items purchased by customer 114 and other information about the transaction and items purchased as disclosed herein.

In addition, to image data and transaction data, sever 106 may also receive weight data from weight sensors. For example, a weight sensor 118 may be attached to a shelf, such as first shelf 112 or cart 120. When customer 114 picks up a product from first shelf 112A, weight sensor 118 may detect a change in weight supported by first shelf 112A and cart 120. For instance, when third item 110C is picked up from first shelf 112A, weight sensor 118 attached to first shelf 112A may detect the reduced weight supported by first shelf 112A and weight sensor 118 attached to cart 120 may detect the increased weight supported by cart 120. The weight data may be used by sever 106 in identifying third item 110C.

Figure 2:
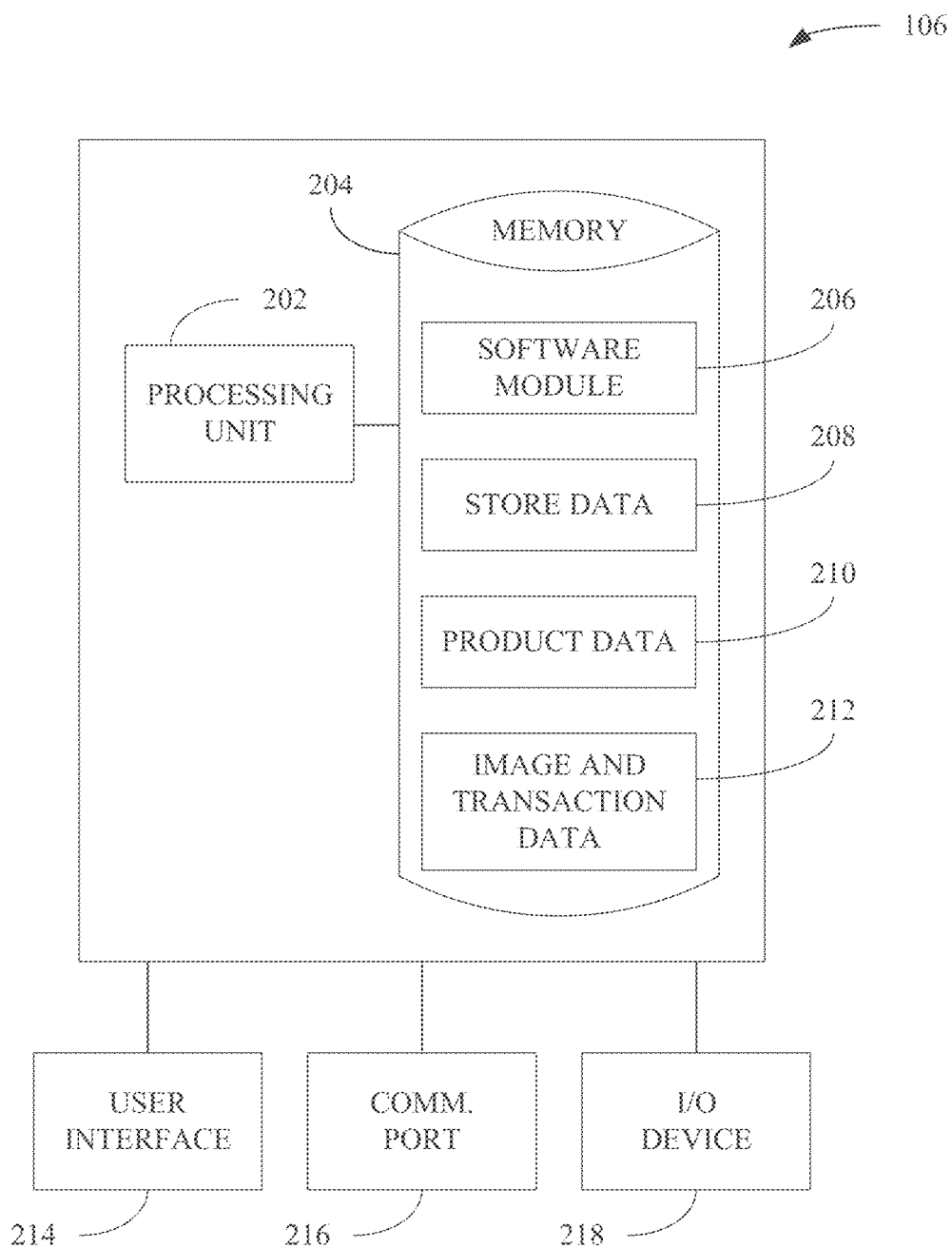
FIG. 2 shows an example schematic of a server consistent with this disclosure.

FIG. 2 shows an example schematic of server 106. As shown in FIG. 2, server 106 may include a processing unit 202 and a memory 204. The memory 204 may include a software module 206, a store 208, product data 210, and image and transaction data 212. While executing on processing unit 202, the software module 206 may perform processes for generating a planogram for a store, such as store 102, including, for example, one or more stages included in a method 300 described below with respect to FIG. 3. Server 106 may also include a user interface 214, a communications port 216, and an input/output (I/O) device 218.

As disclosed herein, store data 208 may include an existing planogram that may be updated using the methods and systems disclosed herein. Store data 208 may also include location data for cameras, such as cameras 104. Store data 208 may also include data regarding shelves, such as shelves 112. For example, store data 208 may include angles at which cameras are arranged relative to one or more shelves. A camera may capture images of more than one shelf so store data 208 may include a listing of shelves covered by respective cameras and the angle at which images captured by the respective cameras are taken. The angle data may be used by server 106 in calculating a trajectory of a customer's body part, such as customer 114's arm.

Product data 210 may include properties of the various items, such as items 110, located within the store. Non-limiting examples of product data 210 may include the weight, cost, packaging dimensions, packaging colors, barcode information, stock images of products for one or more angles, etc.

Image and transaction data 212 may include the images captured by cameras 104 and transaction data captured by point of sale terminal 116. For example, the image portion of image and transaction data 212 may include, but is not limited to, the images, data that identifies the camera that captured each of the images, a time stamp for each image, and location values. The data that identifies the camera that captured each of the images, may also include an angle the camera that captured an image is oriented to relative to an item captured in the image and a location of the camera within a store. The transaction portion of image and transaction data 212 may include, but is not limited to, items purchased during a transaction, a time the transaction occurred, customer information such as a marker within the image used to track movement of customer 114, etc.

User interface 214 can include any number of devices that allow a user to interface with server 106. Non-limiting examples of user interface 214 include a keypad, a microphone, a display (touchscreen or otherwise), etc.

Communications port 216 may allow server 106 to communicate with various information sources and devices, such as, but not limited to, remote computing devices, mobile devices, peripheral devices, etc. Non-limiting examples of communications port 216 include, Ethernet cards (wireless or wired), Bluetooth® transmitters and receivers, near-field communications modules, etc. User interface 214 may also use communications port 216 to communicate with server 106. For example, user interface 214 may be a tablet computer that includes a virtual keyboard that communicates with server 106 via communications port 216.

I/O device 218 may allow server 106 to receive and output information. Non-limiting examples of I/O device 218 include, a camera (still or video such as cameras 104), a weight detection device such as a weight sensor (such as weigh sensors 118), a printer, a scanner, etc.

Figure 3:
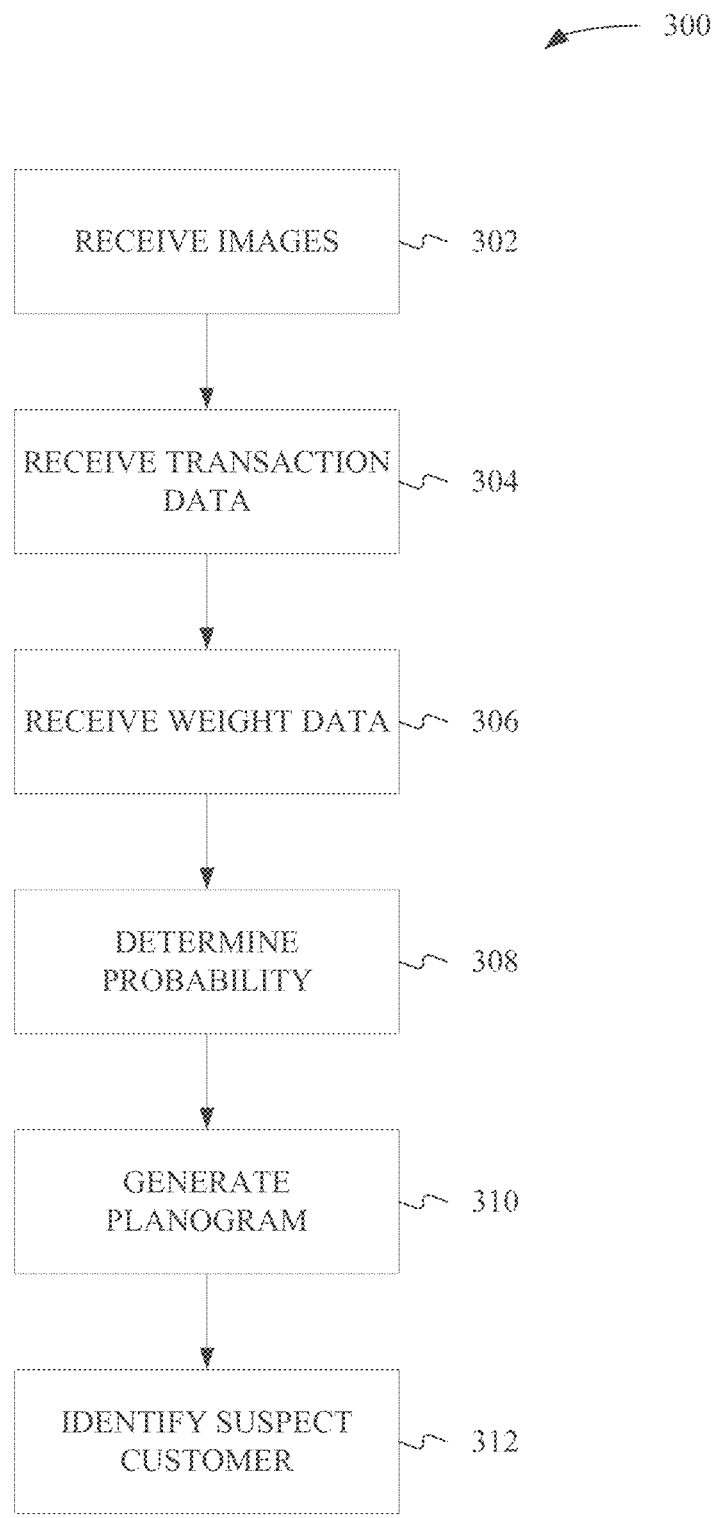
FIG. 3 shows an example method consistent with this disclosure.

FIG. 3 shows an example method 300 consistent with this disclosure. Method 300 may begin at stage 302 where a plurality of images may be received by server 106. For example, a plurality of images may be received by server 106 and at least one of the plurality of images including may include user data representing a user proximate the product. For instance, cameras 104, may capture images of customer 114 and a product retrieved from one of shelves 112. As disclosed herein, the images may be received from a plurality of cameras as customer 114 traverses through store 102 retrieving items.

Receiving the plurality of images may include receiving the plurality of images from a single camera. For example, the plurality of images may be received from first camera 104A. Receiving the plurality of images may include receiving a first subset of images from a first camera and receiving a second subset of images from a second camera. For example, the first subset of images may be received from first camera 104A and the second subset of images may be received from second camera 104B. The first subset of images may have a different perspective of the user proximate the product than the second subset of images. For example, the camera that captures the first subset of images may be on a left side of the customer and the camera that captures the second subset of images may be on a right side of the customer resulting in two different perspectives of the customer retrieved items.

From stage 302 method 300 may proceed to stage 304 where transaction data associate with a completed purchase of the product may be received by server 106. As disclosed herein, the transaction data may include transaction data may include, but is not limited to, items purchased during a transaction, a time the transaction occurred, customer information such as a marker within the image used to track movement of customer 114, etc.

From stage 304 method 300 may proceed to stage 306 wherein weight data may be received. For example, the weight data may be received from weight sensor attached to a cart and/or attached to a shelf associated with the product.

From stage 306 method 300 may proceed stage 308 where a probability of the user retrieving a product based on the transaction data and the user data may be determined. For example, as disclosed herein, the plurality of images are analyzed to track movement of customer 114. The transaction data provides a listing of items customer 114 actual picked up and purchased. If a product was indicated as purchased in the transaction data it can be matched to one of the plurality of images that indicates customer 114 picked up a product. Over time, transaction data and images for a plurality of customers can be collected and paired together. Because no two sets of transaction data and plurality of images will be exactly the same, each customer may provide data points to determine which images correspond to products. Thus, over time, a probability that a given image corresponds to a given product can be refined.

For example, the images may show that a customer A pulls one item from each of locations $Y_1$ and $Y_2$ and the customer's receipt may show a bottle of shampoo and a bottle of dish soap were purchased. Customer B may pull items from locations $Y_1$ and $Y_3$ and customer B's receipt may show that a bottle of shampoo and a loaf of bread were purchased. Because location $Y_1$ and a bottle of shampoo are the common element, the probability that location $Y_1$ contains shampoo is high. As more and more customers purchase items and images are collected, the correlation between locations and items can be made and the confidence in the probabilities for locations corresponding to items increases.

From stage 308 method 300 may proceed to stage 310 where a planogram may be generated. As discussed herein, stages 302, 304, 306, and 308 may be repeated for a plurality of customers. As a result, probabilities can be assigned locations within store 102 to create the planogram.

From stage 310 method 300 may proceed to stage 312 where a suspect customer may be identified. For example, if a customer checks out a point of sale terminal 116 and his or her transaction data does not include a product where images show the customer retrieving an item, then the probability that the customer failed to ring up an item may be high. Stated another way, if an item shows up in the customer's transaction data, but there are no images showing the customer retrieving the item, there the probably the customer retrieved the item would be lower than a predetermined value. Stated another way, the probability that a customer retrieved the item if the customer was not in the area where the item is located will be lower than if the customer had been in the area where the item is located.

The probability used as a standard by which a customer may be identified may change overtime. For instance, as more and more data points are gathered, probability used as the standard may increase due to more data points and a corresponding increasing confidence interval for the probability calculated based on the image and transaction data. As a result, as more data points are gathered, the probability used as the standard may gradually increase from a lower number to a higher number.

If a customer is identified as a suspect customer, the customer may be directed to a location where a cashier or other security staff can examine the customer's items and correct transaction data if needed.

One skilled in the art will understand from this disclosure that the various stages of method 300 may be reordered, repeated, and/or omitted. For example, stage 306 where the weight data is received may be omitted. Stages 302, 304, and 308 may be repeated multiple times before stage 310 is executed. For example, stage 310 may be repeated at the end of predetermined time periods such as, but not limited to, every hour, at the end of the day, at the end of the month, etc. During the time in between executing stage 310, stages 302, 304, and 308 may be repeated for every customer that visits store 102.

EXAMPLES

Example 1 is a method for identifying a product, the method comprising: receiving a plurality of images, at least one of the plurality of images including user data representing a user proximate the product; receiving transaction data associated with a completed purchase of the product; and determining a probability of the user retrieving the product based on the transaction data and the user data.

In Example 2, the subject matter of Example 1 optionally includes generating a planogram for a plurality of products, the product being one of the plurality of products.

In Example 3, the subject matter of any one or more of Examples 1-2 optionally include wherein receiving the plurality of images includes receiving the plurality of images from a single camera.

In Example 4, the subject matter of any one or more of Examples 1-3 optionally include wherein receiving the plurality of images comprises: receiving a first subset of images from a first camera; and receiving a second subset of images from a second camera, wherein the first subset of images has a different perspective of the user proximate the product than the second subset of images.

In Example 5, the subject matter of any one or more of Examples 1-4 optionally include receiving weight data associated with the product.

In Example 6, the subject matter of Example 5 optionally includes wherein the weight data is received from a weight sensor attached to a cart.

In Example 7, the subject matter of any one or more of Examples 5-6 optionally include wherein the weight data is received from a weight sensor attached to a shelf associated with the product.

In Example 8, the subject matter of any one or more of Examples 1-7 optionally include wherein the user data includes object data representing known objects proximate the product.

In Example 9, the subject matter of any one or more of Examples 1-8 optionally include wherein the probability of the user retrieving the product is a Bayesian probability.

In Example 10, the subject matter of any one or more of Examples 1-9 optionally include identifying a suspect customer when the probability is less than a predetermined value.

Example 11 is a method for generating a planogram of a store, the method comprising: receiving a plurality of images, the plurality of images including user data representing a user proximate a plurality of products; receiving transaction data associated with a completed purchase of the plurality of products; determining a probability of the user retrieving each of the plurality of products based on the transaction data and the user data for each of the plurality of products; and generating the planogram for the plurality of products using the probability of the user retrieving each of the plurality of products for each of the plurality of products.

In Example 12, the subject matter of Example 11 optionally includes wherein the user data includes object data representing known objects proximate the product.

In Example 13, the subject matter of Example 12 optionally includes wherein the known objects include shelves, reference marks on a floor, or reference marks on a wall.

In Example 14, the subject matter of any one or more of Examples 11-13 optionally include receiving weight data associated with each of the plurality of products.

Example 15 is a system for generating a planogram of a store, the system comprising: a plurality of cameras located throughout the store; a processor electrically coupled to the plurality of cameras; and a memory electrically coupled to the processor, the memory storing instructions that, when executed by the processor, cause the processor to perform actions comprising: receiving, from the plurality cameras, a plurality of images, the plurality of images including user data representing a user proximate a plurality of products, receiving transaction data associated with a completed purchase of the plurality of products, determining a probability of the user retrieving each of the plurality of products based on the transaction data and the user data for each of the plurality products, and generating the planogram for the plurality of products based on the probability of the user retrieving each of the plurality of products for each of the plurality of products.

In Example 16, the subject matter of Example 15 optionally includes wherein the plurality of cameras are arranged throughout the store to capture different perspectives of the user proximate the plurality of products.

In Example 17, the subject matter of any one or more of Examples 15-16 optionally include a plurality of weight sensors located throughout the store, the actions further comprising receiving weight data associated with the plurality of products from the plurality of weight sensors.

In Example 18, the subject matter of Example 17 optionally includes wherein each of a first subset of the plurality of weight sensors is attached to a cart and each of a second subset of the plurality of weight sensors is attached to a shelf associated with a respective one of the plurality of products.

In Example 19, the subject matter of any one or more of Examples 15-18 optionally include wherein the user data includes object data representing known objects proximate the plurality of products.

In Example 20, the subject matter of any one or more of Examples 15-19 optionally include wherein the actions further comprise identifying a suspect customer when the probability of the user retrieving one of the plurality of products is less than a predetermined value.

In Example 21, the media rotation mechanisms, media terminals, and methods of any one of or any combination of Examples 1-20 are optionally configured such that all elements or options recited are available to use or select from.

The above detailed description refers to the accompanying drawings. Wherever possible, the same reference numbers are used in the drawings and the description to refer to the same or similar elements. While embodiments and examples are described, modifications, adaptations, and other implementations are possible. For example, substitutions, additions, and/or modifications may be made to the elements and stages illustrated in the drawings, and the systems and methods described herein may be modified by substituting, reordering, and/or adding stages to the disclosed methods and/or elements to the discloses systems. Accordingly, the detailed description does not limit this disclosure. Instead, the proper scope of any invention disclosed herein is defined by the appended claims.

It will be readily understood to those skilled in the art that various other changes in the details, material, and arrangements of the parts and method stages which have been described and illustrated in order to explain the nature of the subject matter may be made without departing from the principles and scope of the inventive subject matter as expressed in the subjoined claims.

The invention claimed is:

1. A method for generating a planogram and identifying a suspect customer, the method comprising:
receiving a plurality of images, at least one of the plurality of images including user data representing a body part of a user proximate a first product and a second product;
performing an object tracking operation on the body part of the user;

determining a location of the body part of the user proximate a shelf associated with the first product based on the object tracking operation;

receiving weight data associated with the first product from both a weight sensor attached to a cart and the shelf associated with the first product;

determining a weight decrease associated with the shelf and a weight increase associated with the cart;

receiving transaction data associated with a completed purchase of the first product and not the second product;

determining a probability of the user retrieving the second product based on the transaction data, the weight decrease associated with the shelf and the weight increase associated with the cart, and the user data;

determining the probability is less than a predetermined value and the weight decrease associated with the shelf and the weight increase associated with the cart do not match a known weight data associated with the completed purchase of the first product and identifying the user as the suspect customer; and generating a planogram for the first product based on the transaction data associated with the completed purchase of the first product.

2. The method of claim 1, wherein receiving the plurality of images includes receiving the plurality of images from a single camera.

3. The method of claim 1, wherein receiving the plurality of images comprises:

receiving a first subset of images from a first camera; and
receiving a second subset of images from a second camera,
wherein the first subset of images has a different perspective of the user proximate the product than the second subset of images.

4. The method of claim 1, wherein the user data includes object data representing known objects proximate the first product and the second product.

5. The method of claim 1, wherein the probability of the user retrieving the product is a Bayesian probability.

6. The method of claim 1, wherein the user data includes object data representing known objects proximate the first product and the second product.

7. The method of claim 6, wherein the known objects include shelves, reference marks on a floor, or reference marks on a wall.

8. A system for generating a planogram of a store and identifying a suspect customer, the system comprising:

a plurality of cameras located throughout the store;
a plurality of weight sensors located throughout the store;
a processor electrically coupled to the plurality of cameras; and
a memory electrically coupled to the processor, the memory storing instructions that, when executed by the processor, cause the processor to perform actions comprising:

receiving, from the plurality cameras, a plurality of images, the plurality of images including user data representing a body part of a user proximate a plurality of products, performing an object tracking operation on the body part of the user, determining a location of the body part of the user proximate a shelf associated with at least two of the plurality of products, receiving weight data associated with the plurality of products from the plurality of weight sensors, wherein each of a first subset of the plurality of weight sensors is attached to a cart and each of a second subset of the plurality of weight sensors is attached to a shelf associated with a respective one of the plurality of products, receiving transaction data associated with a completed purchase of the plurality of products, determining a probability of the user retrieving each of the plurality of products based on the transaction data and the user data for each of the plurality products, generating the planogram for the plurality of products based on the probability of the user retrieving each of the plurality of products for each of the plurality of products, and identifying the suspect customer when the probability of the user retrieving one of the plurality of products is less than a predetermined value and a weight decrease and increase do not match a known weight data associated with the completed purchase of the plurality of products.

9. The system of claim 8, wherein the plurality of cameras are arranged throughout the store to capture different perspectives of the user proximate the plurality of products.

10. The system of claim 8, wherein the user data includes object data representing known objects proximate the plurality of products.

* * * * *